(12) United States Patent
Fujimoto et al.

(10) Patent No.: US 7,816,457 B2
(45) Date of Patent: Oct. 19, 2010

(54) METHOD FOR PRODUCING CROSSLINKED POLY(METH)ACRYLATE COMPOUND

(75) Inventors: Nobutaka Fujimoto, Hyogo (JP); Koji Ueda, Hyogo (JP); Masato Fujikake, Hyogo (JP)

(73) Assignee: Sumitomo Seika Chemicals Co., Ltd., Kako-gun (JP)

( * ) Notice: Subject to any disclaimer, the term of this patent is extended or adjusted under 35 U.S.C. 154(b) by 244 days.

(21) Appl. No.: 11/569,819

(22) PCT Filed: May 30, 2005

(86) PCT No.: PCT/JP2005/009893
§ 371 (c)(1), (2), (4) Date: Aug. 21, 2008

(87) PCT Pub. No.: WO2005/116092
PCT Pub. Date: Dec. 8, 2005

(65) Prior Publication Data
US 2008/0319149 A1 Dec. 25, 2008

(30) Foreign Application Priority Data
May 31, 2004 (JP) .............................. 2004-161412
Nov. 9, 2004 (JP) .............................. 2004-325254

(51) Int. Cl.
C08F 20/02 (2006.01)
C08F 16/00 (2006.01)
C08F 26/06 (2006.01)
C08F 2/00 (2006.01)

(52) U.S. Cl. .............. 525/329.7; 525/328.2; 525/326.7; 525/330.2; 526/72; 526/210; 526/265

(58) Field of Classification Search .............. 525/329.7, 525/328.2, 330.2, 326.7; 526/210, 72, 265
See application file for complete search history.

(56) References Cited

U.S. PATENT DOCUMENTS

| 2002/0035223 A1 | 3/2002 | Burkhardt et al. |
| 2004/0115529 A1 | 6/2004 | Nakahara et al. |
| 2007/0106011 A1 | 5/2007 | Husemann et al. |

FOREIGN PATENT DOCUMENTS

| EP | 1128453 A2 | 8/2001 |
| EP | 1170277 A2 | 1/2002 |
| EP | 1381100 A | 1/2004 |
| JP | 07-206687 * | 8/1995 |
| JP | 7-206687 A | 8/1995 |
| JP | 2001-83672 | 3/2001 |
| JP | 2002-151084 | 5/2002 |
| JP | 2002-304996 * | 10/2002 |
| JP | 2002-304996 A | 10/2002 |
| JP | 2005-97409 A | 4/2005 |
| WO | WO-03/080689 A1 | 10/2003 |

OTHER PUBLICATIONS

Office Action Issued in Counterpart CN Application No. 2005800176489 With its English Translation, Issued on Sep. 4, 2009.
Supplementary European Search Report in Counterpart EP Application No. 05743720.4, Dated Feb. 5, 2010.
XP002565969, Mar. 30, 2001, Abstract of JP 2001-083672 A (Fuji Photo Film Co Ltd).

* cited by examiner

Primary Examiner—Ling-Siu Choi
Assistant Examiner—Monique Peets
(74) Attorney, Agent, or Firm—Connolly Bove Lodge & Hutz LLP

(57) ABSTRACT

It is an object of the invention to provide a method of producing a crosslinked poly(meth)acrylic acid compound, in particular a method of producing a crosslinked poly(meth) acrylic acid nitroxide compound, which is a radical compound excellent in solvent stability.

The invention is a method of producing a crosslinked poly(meth)acrylic acid compound resulting from crosslinking of a poly(meth)acrylic acid compound represented by the general formula (1):

[Chem. 1]

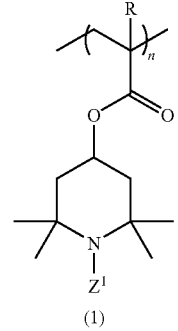

(1)

(in the formula, n $Z^1$'s represent a hydrogen atom(s) and/or an oxygen atom(s) having one unpaired electron, R represents a hydrogen atom or a methyl group and n represents an integer of 5 to 1000000),
which method is characterized by comprising a polymerization step of polymerizing a (meth)acrylic acid compound represented by the general formula (2):

[Chem. 2]

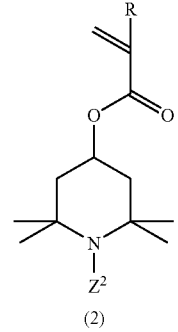

(2)

(in the formula, $Z^2$ represents a hydrogen atom when $Z^1$ is a hydrogen atom, or a hydrogen atom or an oxygen atom having one unpaired electron when $Z^1$ is an oxygen atom having one unpaired electron; and R represents the same group as R in the above general formula (1)) in the presence of a crosslinking agent.

12 Claims, No Drawings

METHOD FOR PRODUCING CROSSLINKED POLY(METH)ACRYLATE COMPOUND

CROSS-REFERENCE TO RELATED APPLICATIONS

This application is a National Stage of PCT/JP2005/009893 filed May 30, 2005 which in turn claims priority from Japanese Applications 2004-161412 filed May 31, 2004 and 2004-325254 filed Nov. 9, 2004.

TECHNICAL FIELD

The invention relates to a method of producing a crosslinked poly(meth)acrylic acid compound and to a method of producing a secondary battery electrode using such a compound. More particularly, it relates to a method of producing a crosslinked poly(meth)acrylic acid nitroxide compound which is excellent in stability against solvents and can be used as a material for a secondary battery electrode high in energy density and in capacity.

BACKGROUND ART

With the rapid market expansion in the fields of notebook personal computers and cellular phones, among others, the demand for small-sized, high-energy-density and high-capacity secondary batteries for use in such machines or instruments has been growing. To meet such demand, secondary batteries in which the electrochemical reaction involving the charge transfer with alkali metal ions, such as lithium ions, serving as charge carriers is utilized have been developed. In particular, lithium ion secondary batteries are utilized as high-capacity secondary batteries high in energy density and excellent in stability in various electronic machines and instruments. In such lithium ion secondary batteries, a lithium-containing transition metal oxide is generally used as an active material in the positive electrode, and carbon as an active material in the negative electrode, and charging and discharging are carried out utilizing the insertion and elimination reactions of lithium ions into and from these active materials.

In recent years, secondary batteries in which radical compounds are utilized as electrode active materials directly contributing to the electrode reaction have been proposed for further capacity increases (cf. Patent Document 1).

In the above-mentioned secondary batteries, organic solvents such as ethylene carbonate, propylene carbonate, dimethyl carbonate, diethyl carbonate, ethyl methyl carbonate, γ-butyrolactone, tetrahydrofuran, dioxofuran, sulfolane, dimethylformamide, dimethylacetamide and N-methyl-2-pyrrolidone are used, either singly or in the form of a mixture of two or more, as solvents for constituting electrolytic solutions transporting charge carriers between the negative and positive electrodes.

However, the radical compounds so far proposed are unsatisfactory in solvent stability and the electrode active material is eluted into the solvents for constituting electrolytic solutions and, therefore, there arises a problem that the stability of the secondary battery performance becomes unsatisfactory.

Patent Document 1: Japanese Kokai Publication 2002-151084

DISCLOSURE OF INVENTION

Problems which the Invention is to Solve

It is an object of the invention to provide a method of producing a crosslinked poly(meth)acrylic acid compound, in particular a method of producing a crosslinked poly(meth)acrylic acid nitroxide compound, which is a radical compound excellent in solvent stability, and a method of producing a secondary battery electrode using such a compound.

Means for Solving the Object

The invention provides a method of producing a crosslinked poly(meth)acrylic acid compound resulting from crosslinking of a poly(meth)acrylic acid compound represented by the general formula (1):

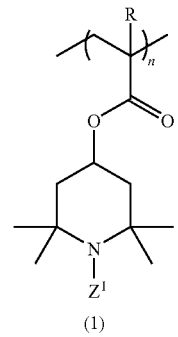

[Chem. 1]

(1)

(in the formula, n $Z^1$s represent a hydrogen atom(s) and/or an oxygen atom(s) having one unpaired electron, R represents a hydrogen atom or a methyl group and n represents an integer of 5 to 1000000), which method is characterized by comprising a polymerization step of polymerizing a (meth)acrylic acid compound represented by the general formula (2):

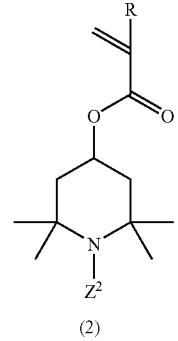

[Chem. 2]

(2)

(in the formula, $Z^2$ represents a hydrogen atom when $Z^1$ is a hydrogen atom, or a hydrogen atom or an oxygen atom having one unpaired electron when $Z^1$ is an oxygen atom having one unpaired electron; and R represents the same group as R in the above general formula (1)) in the presence of a crosslinking agent.

The invention also provides a method of producing a secondary battery electrode, which comprises a coating composition preparation step of preparing a coating composition using a crosslinked poly(meth)acrylic acid compound and a coating step of applying said coating composition to a current collector, said crosslinked poly(meth)acrylic acid compound being a crosslinked poly(meth)acrylic acid nitroxide compound produced by the method of producing a crosslinked poly(meth)acrylic acid compound.

In the following, the invention is described in detail.

The method of producing crosslinked poly(meth)acrylic acid compounds according to the invention is a method of producing crosslinked poly(meth)acrylic acid compounds via a polymerization step in which a (meth)acrylic acid compound represented by the general formula (2) given above is used.

The crosslinked poly(meth)acrylic acid compound is the product of crosslinking of a poly(meth)acrylic acid compound represented by the general formula (1) given above.

In the above general formula (1), n $Z^1$s represent a hydrogen atom(s) and/or an oxygen atom(s) having one unpaired electron. By saying "n $Z^1$s in the above general formula (1) represent a hydrogen atom(s) and/or an oxygen atom(s) having one unpaired electron" herein, it is meant that there are three cases, namely (i) the case in which each of n $Z^1$s is a hydrogen atom, (ii) the case in which each of n $Z^1$s is an oxygen atom having one unpaired electron and (iii) the case in which a repeating unit (a) in which $Z^1$ is a hydrogen atom and a repeating unit (b) in which $Z^1$ is an oxygen atom having one unpaired electron are both included and the total number of both repeating units is n. The repeating unit (a) and repeating unit (b) may be bound together alternately or may form a block copolymer. The phrase "oxygen atom having one unpaired electron" as used herein means an oxygen atom having thereon the unpaired electron which a free radical has.

In the above general formula (1), R represents a hydrogen atom or a methyl group, and n represents an integer of 5 to 1000000. The integer n is preferably 10 to 500000.

In the above-mentioned polymerization step, a (meth)acrylic acid compound represented by the general formula (2) given above is polymerized in the presence of a crosslinking agent. Since the polymerization in the polymerization step is carried out in the presence of a crosslinking agent, it is believed that both the polymerization reaction and crosslinking reaction can be carried out in that step; thus, a crosslinked polymer excellent in solvent stability can be obtained efficiently. The crosslinking agent and the polymerization step will be described later herein.

In the above general formula (2), R represents the same group as R in the general formula (1).

In the general formula (2), $Z^2$ represents a hydrogen atom when $Z^1$ in the general formula (1) is a hydrogen atom, or a hydrogen atom or an oxygen atom having one unpaired electron when $Z^1$ is an oxygen atom having one unpaired electron.

The method of producing crosslinked poly(meth)acrylic acid compounds according to the invention comprises the above-mentioned polymerization step.

When $Z^1$ in the above general formula (1) is the same as $Z^2$ in the above general formula (2), the method of producing crosslinked poly(meth)acrylic acid compounds according to the invention produces a crosslinked poly(meth)acrylic acid compound resulting from crosslinking of a poly(meth)acrylic compound represented by the general formula (1) in the above-mentioned polymerization step by polymerization of a (meth)acrylic acid compound represented by the general formula (2) in the presence of a crosslinking agent.

The (meth)acrylic acid compound represented by the general formula (2) (in which $Z^2$ is an oxygen atom having one unpaired electron) (hereinafter sometimes referred to as "(meth)acrylic acid nitroxide compound") is not particularly restricted but may be any of those obtained by a method known in the art, for example by nitroxidation of 2,2,6,6-tetramethyl-4-piperidinyl(meth)acrylate.

When n $Z^1$s in the above general formula (1) each is an oxygen atom having one unpaired electron or comprise hydrogen atoms and oxygen atoms having one unpaired electron and $Z^2$ in the above general formula (2) is a hydrogen atom, the method of producing crosslinked poly(meth)acrylic acid compounds according to the invention also produces a crosslinked poly(meth)acrylic acid compound resulting from crosslinking of a poly(meth)acrylic acid compound (hereinafter sometimes referred to as "poly(meth)acrylic acid nitroxide compound") represented by the general formula (1) (in which n $Z^1$s each is an oxygen atom having one unpaired electron or comprise hydrogen atoms and oxygen atoms having one unpaired electron) by carrying out a nitroxidation step for nitroxidation as well following the above-mentioned polymerization step in which a (meth)acrylic acid compound represented by the general formula (2) (in which $Z^2$ is a hydrogen atom) (hereinafter sometimes referred to as "(meth)acrylic acid imino compound") is polymerized in the presence of a crosslinking agent.

Although the above-mentioned nitroxidation step is preferably carried out until complete nitroxidation of all hydrogen atoms, the nitroxidation may be incomplete and the product may contain both residual hydrogen atoms and oxygen atoms having one unpaired electron. When the nitroxidation is carried out completely, n $Z^1$s in the general formula (1) all exclusively become oxygen atoms having one unpaired electron and, when the nitroxidation is carried out incompletely, they become hydrogen atoms and oxygen atoms having one unpaired electron. In the present description, a compound occurring after the above nitroxidation step is sometimes called, for convenience sake, with an additional term "nitroxide compound" to indicate that there are only oxygen atoms having one unpaired electron, whereas when hydrogen atoms may also occur, such additional term is omitted, however, it is to be noted that unless otherwise specified, a relevant compound referred to can conceptually contain residual hydrogen atoms due to incomplete nitroxidation.

The poly(meth)acrylic acid compound represented by the above general formula (1) conceptually includes a poly(meth)acrylic acid imino compound represented by the general formula (1a) given hereinbelow and a poly(meth)acrylic acid nitroxide compound represented by the general formula (1b) given hereinbelow. The (meth)acrylic acid compound represented by the above general formula (2) conceptually includes a (meth)acrylic acid imino compound represented by the general formula (2a) given hereinbelow and a (meth)acrylic acid nitroxide compound represented by the general formula (2b) given hereinbelow.

The method of producing crosslinked poly(meth)acrylic acid compounds according to the invention as mentioned hereinabove is represented by the following reaction scheme.

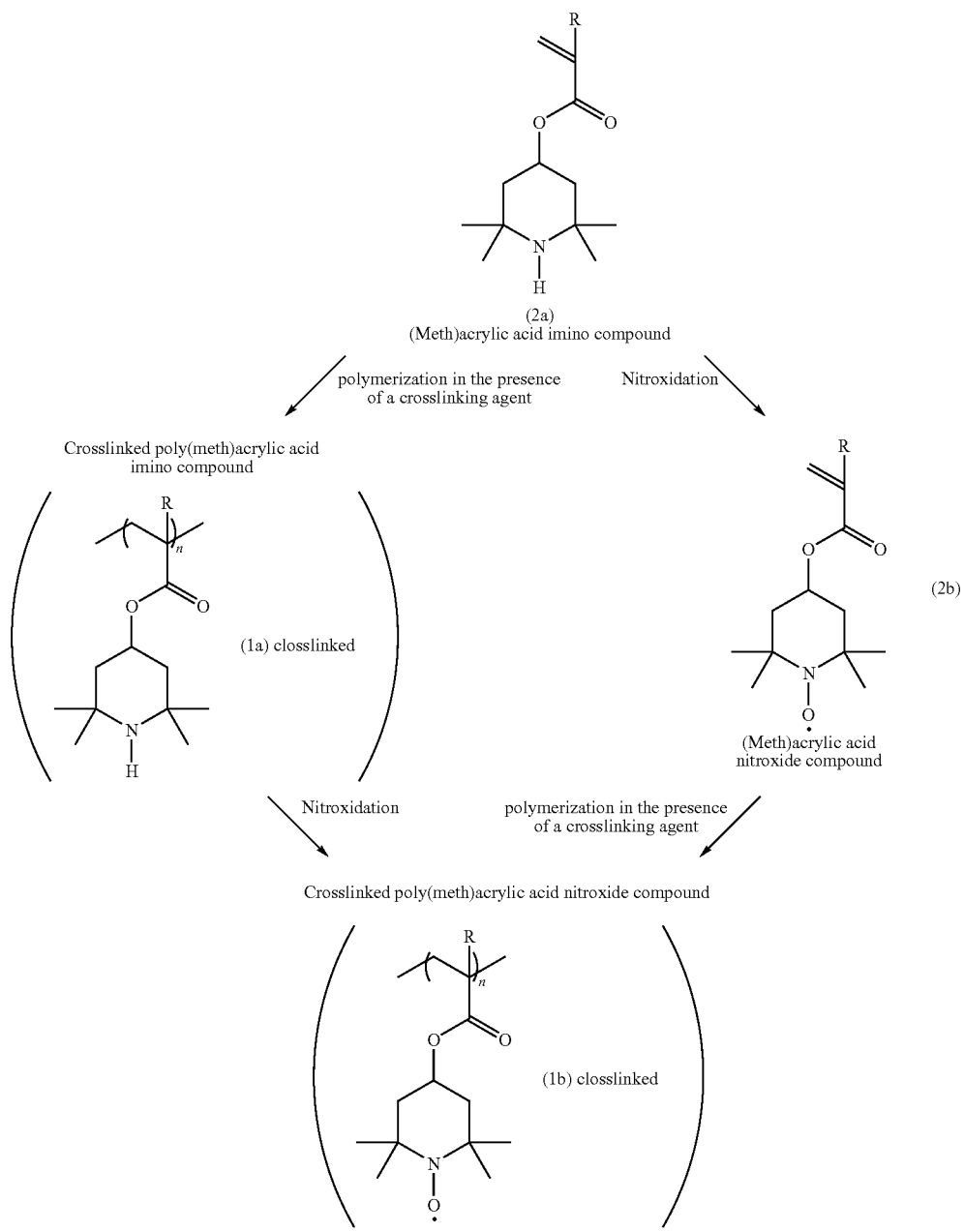

[Chem. 3]

Each of the general formulas appearing in the above scheme will be described later herein. In the following, the method of producing crosslinked poly(meth)acrylic acid compounds according to the invention, which includes the case in which a (meth)acrylic acid imino compound represented by the general formula (2a) is used as the monomer in the polymerization step (hereinafter sometimes referred to as "first mode of embodiment of the invention") and the case in which a (meth)acrylic acid nitroxide compound represented by the general formula (2b) is used as the monomer in the polymerization step (hereinafter sometimes referred to as "second mode of embodiment of the invention"), is further described mode by mode.

In the first mode of embodiment of the invention, namely of the method of producing crosslinked poly(meth)acrylic acid compounds, the above-mentioned poly(meth)acrylic acid compound is a poly(meth)acrylic acid imino compound of the general formula (1), n $Z^1$s each being a hydrogen atom, and the above-mentioned (meth)acrylic acid compound is a (meth)acrylic acid imino compound of the general formula (2), $Z^2$ being a hydrogen atom.

Thus, the first mode of embodiment is a method of producing crosslinked poly(meth)acrylic acid imino compounds which is characterized in that a (meth)acrylic acid imino compound represented by the general formula (2a):

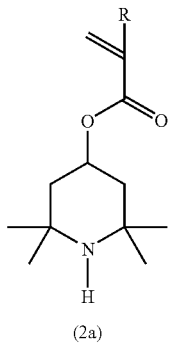

(2a)

(in the formula, R represents a hydrogen atom or a methyl group) is polymerized in the presence of a crosslinking agent to produce a crosslinked poly(meth)acrylic acid imino compound resulting from crosslinking of a poly(meth)acrylic acid imino compound represented by the general formula (1a):

[Chem. 5]

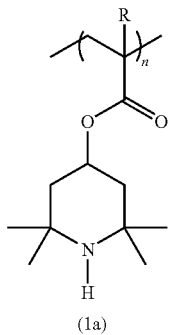

(1a)

(in the formula, R represents the same group as R in the above general formula (2a) and n represents an integer of 5 to 1000000).

The first mode of embodiment of the invention, namely of the method of producing crosslinked poly(meth)acrylic acid compounds, also includes the following modifications: the above-mentioned poly(meth)acrylic acid compound is a poly(meth)acrylic acid nitroxide compound of the general formula (1), n $Z^1$s each being an oxygen atom having one unpaired electron or comprising hydrogen atoms and oxygen atoms having one unpaired electron;

the above-mentioned (meth)acrylic acid compound is a (meth)acrylic acid imino compound of the general formula (2), $Z^2$ being a hydrogen atom;

the above-mentioned polymerization step is to produce a crosslinked poly(meth)acrylic acid imino compound resulting from crosslinking of a poly(meth)acrylic acid imino compound represented by the general formula (1a); and the above-mentioned method of producing a crosslinked poly(meth)acrylic acid compound further comprises a nitroxidation step for the nitroxidation of the above-mentioned crosslinked poly(meth)acrylic acid imino compound.

Thus, the first mode of embodiment which includes the above-mentioned nitroxidation step as well is a method of producing crosslinked poly(meth)acrylic acid nitroxide compounds which is characterized in that it comprises (I) the step of producing a crosslinked poly(meth)acrylic acid imino compound resulting from crosslinking of a poly(meth)acrylic acid imino compound represented by the general formula (1a) by polymerizing a (meth)acrylic acid imino compound represented by the general formula (2a) in the presence of a crosslinking agent and (II) the step of producing a crosslinked poly(meth)acrylic acid nitroxide compound by nitroxidation of the above-mentioned poly(meth)acrylic acid imino compound, wherein the crosslinked poly(meth)acrylic acid nitroxide compound is a crosslinked product derived from a poly(meth)acrylic acid nitroxide compound represented by the general formula (1b):

[Chem. 6]

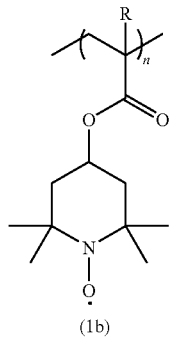

(1b)

(in the formula, R represents the same group as R in the above general formula (2a) and n represents the same integer as n in the general formula (1a)).

In the present description, the poly(meth)acrylic acid nitroxide compound is represented by the general formula (1b) for convenience sake, however, since it is a product after the nitroxidation step, it may contain residual hydrogen atoms due to incomplete nitroxidation, as mentioned hereinabove.

The crosslinked poly(meth)acrylic acid nitroxide compound, so referred to herein, is the product of crosslinking of the above-mentioned poly(meth)acrylic acid nitroxide compound and, therefore, may likewise contain residual hydrogen atoms due to incomplete nitroxidation.

In the above general formula (2a), R represents a hydrogen atom or a methyl group, and the (meth)acrylic acid imino compound represented by the general formula (2a) is specifically 2,2,6,6-tetramethyl-4-piperidinyl (meth)acrylate and a corresponding commercial product can be used.

In the invention, acrylic acid and methacrylic acid are collectively referred to as "(meth)acrylic acid", and an acrylate and the corresponding methacrylate as "(meth)acrylate".

The crosslinking agent to be used in the practice of the invention is not particularly restricted but may be any of those compounds which have a plurality of polymerizable unsaturated groups within the molecule and, thus, for example, (meth)acrylic acid-based polyfunctional compounds, allyl ether type polyfunctional compounds and vinylic polyfunctional compounds. As the (meth)acrylic acid-based polyfunctional compounds, there may be mentioned, for example, ethylene glycol di(meth)acrylate, diethylene glycol di(meth)acrylate, polyethylene glycol di(meth)acrylate, 1,3-propanediol di(meth)acrylate, 1,3-butanediol di(meth)acrylate, 1,4-butanediol di(meth)acrylate, 1,5-pentanediol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, trimethylolpropane tri(meth)acrylate, glycerol di(meth)

acrylate and 2-hydroxy-3-(meth)acryloyloxypropyl(meth)acrylate. As the allyl ether type polyfunctional compounds, there may be mentioned, for example diethylene glycol diallyl ether and dibutylene glycol diallyl ether. As the vinylic polyfunctional compounds, there may be mentioned divinylbenzene and the like. Among them, (meth)acrylic acid-based polyfunctional compounds are preferably used in view of their high reactivity and, in particular, ethylene glycol di(meth)acrylate, 1,3-butanediol di(meth)acrylate and 1,4-butanediol di(meth)acrylate are preferably used. These crosslinking agents may be used singly or in admixture.

As for the amount of the crosslinking agent to be used, it is desirable, from the viewpoint that the crosslinked poly(meth)acrylic acid nitroxide compound finally obtained may show a sufficient level of stability against solvents as a result of an adequate extent of crosslinking and from the viewpoint of producing an effect proportional to the amount used, to use the crosslinking agent preferably in a proportion of 0.00001 to 0.25 mole, more preferably 0.00005 to 0.1 mole, still more preferably 0.0001 to 0.05 mole, per mole of the (meth)acrylic acid imino compound mentioned above.

In the practice of the invention, the method of subjecting the above-mentioned (meth)acrylic acid imino compound to polymerization reaction in the presence of the above-mentioned crosslinking agent is not particularly restricted but may be, for example, the method which comprises charging a reactor equipped with a stirrer, thermometer, nitrogen inlet tube and condenser with respective predetermined amounts of the (meth)acrylic acid imino compound, the crosslinking agent and an inert solvent and, after deoxygenation with nitrogen gas, adding a polymerization initiator with stirring.

As the inert solvent, there may be mentioned, for example, aromatic hydrocarbon solvents such as benzene, toluene and xylene, and ether type solvents such as diethyl ether and tetrahydrofuran.

From the viewpoint of smooth progress of the reaction and from the viewpoint of obtaining an effect proportional to the amount used, the inert solvent is preferably used in an amount of 50 to 2000 parts by weight per 100 parts by weight of the (meth)acrylic acid imino compound.

The polymerization initiator is not particularly restricted but includes, among others, peroxide type polymerization initiators such as benzoyl peroxide, lauroyl peroxide, cumene hydroperoxide, tert-butyl hydroperoxide and potassium persulfate; azo type polymerization initiators such as α,α'-azobisiso-butyronitrile, 2,2'-azobis-2,4-dimethylvaleronitrile and dimethyl 2,2'-azobisisobutyrate; redox system polymerization initiators such as ammonium ferrous sulfate/ammonium persulfate, ethanolamine/potassium persulfate and sodium bromate/sulfur dioxide; and anionic polymerization initiators such as Grignard reagents (n-butylmagnesium bromide, isobutylmagnesium bromide, tert-butylmagnesium bromide, n-butylmagnesium chloride, isobutylmagnesium chloride, tert-butylmagnesium chloride, etc.), alkyllithiums (n-butyllithium, tert-butyllithium, 1,1-diphenylhexyllithium, etc.). Among them, azo type polymerization initiators such as α,α'-azobisisobutyronitrile are preferably used in view of their being inexpensive and easy to handle.

The level of addition of the polymerization initiator may vary depending on the polymerization initiator species employed and the reaction temperature but, generally, it is 0.005 to 5 parts by weight per 100 parts by weight of the (meth)acrylic acid imino compound. In carrying out the above-mentioned reaction, such an additive(s) as a chain transfer agent (e.g. isopropyl alcohol) and/or a polymerization terminator (e.g. methanol) may be added in an appropriate amount according to need.

The reaction temperature is preferably −20 to 100° C., more preferably −10 to 80° C. The reaction time cannot be absolutely specified since it may vary depending on the reaction temperature but generally 2 to 10 hours.

The thus-obtained reaction product, namely crosslinked poly(meth)acrylic acid imino compound, can be isolated by mixing the reaction mixture with a solvent, for example an aliphatic hydrocarbon such as hexane, to thereby cause the crosslinked poly(meth)acrylic acid imino compound to precipitate, followed by filtration, for instance. Further, the product can be purified by removing the unreacted reactants by washing with hexane and/or methanol, for instance, followed by drying.

The above-mentioned method of subjecting the (meth)acrylic acid imino compound to polymerization reaction in the presence of the above-mentioned crosslinking agent can be carried out generally in the manner of solution polymerization. In the practice of the invention, the solution polymerization is carried out using, as the inert solvent mentioned above, a solvent in which solubility of the (meth)acrylic acid imino compound is relatively high.

In the first mode of embodiment of the invention, the suspension polymerization method and emulsion polymerization method are preferably used, in addition to the above-mentioned solution polymerization method, as the polymerization method in view of the ease of isolation of the reaction product.

As the suspension polymerization method, there may be mentioned, for example, the method which comprises using a reactor equipped with a stirrer, thermometer, nitrogen inlet tube and condenser, mixing a mixture of respective predetermined amounts of the (meth)acrylic acid imino compound, the crosslinking agent and an oil-soluble radical polymerization initiator in an inert hydrocarbon solvent, together with a surfactant, with water, which is inert, and, after effecting dispersion and after deoxygenation with nitrogen gas, heating the resulting dispersion with stirring.

As the inert hydrocarbon solvent to be used in the suspension polymerization, there may be mentioned, for example, aromatic hydrocarbon solvents such as benzene, toluene and xylene, acyclic saturated hydrocarbon solvents such as n-hexane, n-heptane and ligroin, cyclic saturated hydrocarbon solvents such as cyclopentane, methylcyclopentane, cyclohexane and methylcyclohexane, and halogenated hydrocarbon solvents such as dichloromethane, chloroform and dichloroethane. Among them, aromatic hydrocarbon solvents are preferred from the viewpoint that they are readily commercially available and inexpensive and the compound obtained is stable in quality; toluene is more preferred.

The amount of the inert hydrocarbon solvent to be used is preferably 50 to 300 parts by weight, more preferably 100 to 200 parts by weight, per 100 parts by weight of the (meth)acrylic acid imino compound from the viewpoint of sufficient dissolution of the (meth)acrylic acid imino compound and smooth progress of the polymerization reaction and from the viewpoint of obtaining an effect proportional to the amount used.

The amount of water to be used is preferably 200 to 1500 parts by weight, more preferably 300 to 1000 parts by weight, per 100 parts by weight of the (meth)acrylic acid imino compound from the viewpoint of satisfactory removal of the heat of polymerization and from the viewpoint of rendering the polymerization temperature readily controllable.

The oil-soluble radical polymerization initiator to be used in the suspension polymerization method is not particularly restricted but includes, among others, peroxide type polymerization initiators such as benzoyl peroxide, di-tert-butyl peroxide, lauroyl peroxide, diisopropyl peroxydicarbonate and dicyclohexyl peroxydicarbonate; azo type polymerization initiators such as α,α'-azobisisobutyronitrile, 2,2'-azobis-2,4-dimethylvaleronitrile and dimethyl 2,2'-azobisisobutyrate; and redox system polymerization initiators such as benzoyl peroxide/dimethylaniline, di-tert-butyl peroxide/dimethylaniline and lauroyl peroxide/dimethylaniline. Among them, azo type polymerization initiators such as α,α'-azobisisobutyronilrile, which are inexpensive and easy to handle, are preferably used.

The amount of the oil-soluble radial polymerization initiator to be used may vary depending on the oil-soluble radical polymerization initiator species employed and the reaction temperature but generally is 0.005 to 5 parts by weight per 100 parts by weight of the (meth)acrylic acid imino compound. In carrying out the above reaction, an additive(s) such as a chain transfer agent such as isopropyl alcohol and/or a polymerization terminator such as methanol may be added each in an appropriate amount according to need.

Any of anionic surfactants, cationic surfactants, nonionic surfactants and amphoteric surfactants may be used as the surfactant in the suspension polymerization method.

As the anionic surfactants, there may be mentioned fatty acid sodium salts, fatty acid potassium salts, sodium alkyl sulfates, sodium alkylbenzenesulfonates, sodium alkanesulfonates, sodium alkyl phosphates, acyloylmethyl taurates, sodium N-methyl-N-acylamidopropionates, sodium monoalkylbiphenyl ether disulfonates, sodium naphthalenesulfonate-formaline condensates, sodium acylglutamates, sodium polyoxyethylene alkyl ether sulfates, sodium polyoxyethylene alkylphenyl ether alkylbenzenesulfonates, sodium polyoxyethylene alkyl ether methylcarboxylates, sodium polyoxyethylene alkyl ether ethanesulfonates, etc.

As the cationic surfactants, there may be mentioned monoalkyltrimethylammonium methosulfates, cationized cellulose species, alkyltrimethylammonium chlorides, distearyldimethylammonium chloride, dialkyldimethylammonium chlorides, dialkyldimethylbenzylammonium chlorides, alkylpyridinium chlorides, etc.

As the nonionic surfactants, there may be mentioned fatty acid monoglycerides, sorbitan fatty acid partial esters, polyoxyethylene alkyl ethers, polyoxyethylene alkylphenyl ethers, polyoxyethylene fatty acid monoglycerides, polyoxyethylenesorbitol fatty acid partial esters, polyoxyethylenesorbitan fatty acid partial esters, polyoxyethylene lanolin alcohol ethers, polyethylene glycol fatty acid monoesters, polyethylene glycol fatty acid diesters, polyoxyethylene fatty amines, polyglycerol fatty acid partial esters, bis(2-hydroxyethyl) alkyl-amines, alkyldimethylamine oxides, fatty acid alkylolamides, ω-methoxypolyoxyethylene α-alkyl ethers, polyoxyethylene-polyoxypropylene block copolymers, polyoxyethylene-polyoxypropylene alkyl ethers, polyoxyethylene-acetylene glycols, sugar fatty acid partial esters, etc.

As the amphoteric surfactants, there may be mentioned N-acylamidopropyl-N,N-dimethylammoniobetaines, N-acylamidopropyl-N',N'-dimethyl-N'-β-hydroxypropylammoniosulfobetaines, N-acylamidoethyl-N'-hydroxyethyl-N'-carboxymethylammoniobetaines, N-alkyl-N-dimethyl-N-carboxymethylammoniobetaines, alkyl diaminoethylglycines, acylated polypeptides, etc.

Among those surfactants, sodium alkylbenzenesulfonates and sodium polyoxyethylene alkylphenyl ether alkylbenzenesulfonates are preferably used from the viewpoint that they are readily available commercially and inexpensive and the quality of the compound obtained becomes stable; in particular, sodium dodecylbenzenesulfonate and sodium polyoxyethylene nonylphenyl ether dodecylbenzenesulfonate are preferably used.

From the viewpoint of smooth progress of the reaction and from the viewpoint of obtaining an effect proportional to the amount used, the above-mentioned surfactant is preferably used in an amount of 0.05 to 1 part by weight, more preferably 0.1 to 0.4 part by weight, per 100 parts by weight of the water mentioned above.

As for the reaction temperature, 30 to 100° C. is preferred, and 40 to 80° C. is more preferred. The reaction time may vary depending on the reaction temperature, hence cannot be absolutely specified, however, it is generally 0.5 to 10 hours. The thus-produced product, namely crosslinked poly(meth)acrylic acid imino compound occurs as particles in the reaction mixture and can be isolated by filtering the reaction mixture. Further, the product can be purified by removing unreacted reactants by washing using water and/or hexane, for instance, followed by drying.

As the emulsion polymerization method, another method of polymerization in the first mode of embodiment of the invention, there may be mentioned, for example, the method which comprises using a reactor equipped with a stirrer, thermometer, nitrogen inlet tube and condenser, mixing respective predetermined amounts of the (meth)acrylic acid imino compound, crosslinking agent and surfactant with water, which is an inert solvent and, after effecting dispersion and after deoxygenation with nitrogen gas, adding a water-soluble radical polymerization initiator, and heating the resulting mixture with stirring.

The water-soluble radical initiator to be used in the emulsion polymerization method is not particularly restricted but includes, among others, peroxide type polymerization initiators such as ammonium persulfate, sodium persulfate and potassium persulfate, and redox system polymerization initiators such as ammonium ferrous sulfate/ammonium persulfate and ethanolamine/potassium persulfate. Among them, peroxide type polymerization initiators such as potassium persulfate, which are inexpensive and easy to handle, are preferably used.

In the above emulsion polymerization, the surfactant species and amount, polymerization initiator amount, inert solvent water amount, reaction temperature and reaction time to be applied may be the same as in the suspension polymerization.

In the above reaction, the same inert hydrocarbon solvent as that to be used in the suspension polymerization method may be added in an appropriate amount to dissolve the (meth)acrylic acid imino compound and, further, an additive(s), for example a chain transfer agent such as isopropyl alcohol and/or a polymerization terminator such as methanol, may be added each in an appropriate amount according to need.

The thus-produced reaction product, namely crosslinked poly(meth)acrylic acid imino compound, can be isolated, for example, by mixing the reaction mixture with a large amount of cold water to cause the crosslinked poly(meth)acrylic acid imino compound to precipitate out, followed by filtration, for instance. Further, the product can be purified by removing the unreacted reactants by washing with water, hexane and/or methanol, for instance, followed by drying.

In the first mode of embodiment of the invention, a crosslinked poly(meth)acrylic acid nitroxide compound can be produced by nitroxidation of the crosslinked poly(meth)acrylic acid imino compound obtained in the above manner.

In practicing the invention, the method of nitroxidation of the crosslinked poly(meth)acrylic acid imino compound is not particularly restricted but, for example, any of those methods of oxidizing sterically hindered secondary amine with an oxidizing agent to produce the corresponding nitroxide free radical-containing compounds which are known in the art can be used, and the procedure of this method may comprise, for example, mixing the crosslinked poly(meth)acrylic acid imino compound with an inert solvent and allowing the reaction to proceed while adding an oxidizing agent with stirring.

As the inert solvent to be used in the above nitroxidation, there may be mentioned, for example, halogenated hydrocarbons such as dichloromethane, chloroform and dichloroethane, aliphatic nitriles such as acetonitrile, propionitrile and butyronitrile, aromatic nitriles such as benzonitrile and tolunitrile, alcohols such as methanol, ethanol, n-propanol, isopropanol, n-butanol, sec-butanol, isobutanol and tert-butanol, and aromatic hydrocarbons such as benzene, toluene and xylene. Among them, halogenated hydrocarbons such as dichloromethane, chloroform and dichloroethane and alcohols such as methanol and ethanol are preferably used.

The amount of the inert solvent to be used in the nitroxidation is desirably 50 to 5000 parts by weight, more preferably 100 to 3000 parts by weight, per 100 parts by weight of the crosslinked poly(meth)acrylic acid imino compound from the viewpoint of smooth progress of the reaction and from the viewpoint of obtaining an effect proportional to the amount used.

As the oxidizing agent, there may be mentioned, for example, peroxides such as hydrogen peroxide, performic acid, peracetic acid, perbenzoic acid and perphthalic acid, and halides thereof, oxides such as silver oxide, lead tetraacetate, potassium hexacyanoferrate(III) and potassium permanganate, and air.

From the viewpoint of smooth progress of the reaction and from the viewpoint of obtaining an effect proportional to the amount used, the oxidizing agent is used preferably in a proportion of 1 to 40 moles per mole of the (meth)acrylic acid imino compound used for the production of the crosslinked poly(meth)acrylic acid imino compound, and more preferably and desirably, that proportion is 1.5 to 15 moles and, in the case in which the method of polymerization in the polymerization step in the first mode of embodiment of the invention is the solution polymerization method, it is desirable that the proportion in question be preferably 1.5 to 5.0 moles, more preferably 1.6 to 3.0 moles.

In the above reaction, a catalyst may be used. As the catalyst, there may be mentioned those used in conventional nitroxidation reactions.

As specific examples of the catalyst, there may be mentioned, compounds containing a metal element selected from the group 6 elements (e.g. tungsten, molybdenum) of the 18-group type periodic table of the elements, for example, tungsten compounds such as tungstic acid, phosphotungstic acid, paratungstic acid, alkali metal salts (sodium salt, potassium salt, etc.) and ammonium salts of these, tungsten oxide and tungsten carbonyl; and molybdenum compounds such as molybdic acid, phosphomolybdic acid, paramolybdic acid, alkali metal salts (sodium salt, potassium salt, etc.) and ammonium salts of these, molybdenum oxide and molybdenum carbonyl, and more specifically, there may be mentioned ammonium paratungstate, sodium tungstate, phosphotungstic acid, sodium molybdate, molybdenum trioxide and molybdenum hexacarbonyl, among others.

From the viewpoint of smooth progress of the reaction and from the viewpoint of obtaining an effect proportional to the amount used, it is desirable that the catalyst be used preferably in an amount of 0.001 to 20 parts by weight, more preferably 0.01 to 10 parts by weight, per 100 parts by weight of the crosslinked poly(meth)acrylic acid imino compound and, in the case in which the method of polymerization in the polymerization step in the first mode of embodiment of the invention is the solution polymerization method, it is desirable that the amount in question be preferably 0.001 to 0.1 part by weight, more preferably 0.01 to 0.05 part by weight, per 100 parts by weight of the crosslinked poly(meth)acrylic acid imino compound.

The above reaction is preferably carried out at a temperature of 0 to 75° C., more preferably 20 to 50° C.

While in carrying out the above reaction, it is also possible to mix up the crosslinked poly(meth)acrylic acid imino compound, inert solvent and oxidizing agent and then allow the reaction to proceed with stirring at the temperature mentioned above, it is preferable that the reaction be carried out while adding the oxidizing agent, as mentioned hereinabove, since the reaction can be carried out with ease and in good yields.

The period of time during which the reaction is allowed to proceed while adding the oxidizing agent is not particularly restricted but generally is 1 to 10 hours, preferably 3 to 6 hours. Further, after completion of the addition of the oxidizing agent, the reaction mixture is generally maintained at the temperature mentioned above for 1 to 10 hours to drive the reaction to completion.

The thus-produced crosslinked poly(meth)acrylic acid nitroxide compound can be isolated from the reaction mixture by the combined use of such operations as filtration and drying. In carrying out the above reaction, it is not always necessary that the crosslinked poly(meth)acrylic acid imino compound be dissolved in an inert solvent; in a swollen state, for instance, the above reaction can proceed with ease.

Now, the second mode of embodiment of the invention relating to the method of producing crosslinked poly(meth)acrylic acid compounds is described.

In the second mode of embodiment of the invention relating to the method of producing crosslinked poly(meth)acrylic acid compounds, the poly(meth)acrylic acid compound is a poly(meth)acrylic acid nitroxide compound of the general formula (1), n $Z^1$s each being an oxygen atom having one unpaired electron or comprising hydrogen atoms and oxygen atoms having one unpaired electron, and the (meth)acrylic acid compound is a (meth)acrylic acid nitroxide compound of the general formula (2), $Z^2$ being an oxygen atom having one unpaired electron, the compound being allowed to contain a (meth)acrylic acid imino compound of the general formula (2), $Z^2$ being a hydrogen atom. In the present description, the phrase "the (meth)acrylic acid compound is a (meth)acrylic acid nitroxide compound being allowed to contain a (meth)acrylic acid imino compound" means that the (meth)acrylic acid compound is a set of (meth)acrylic acid nitroxide compound molecules which may contain (meth)acrylic acid imino compound molecules.

Thus, the above-mentioned second mode of embodiment is a method of producing crosslinked poly(meth)acrylic acid nitroxide compounds which is characterized in that a (meth)acrylic acid nitroxide compound represented by the general formula (2b):

[Chem. 7]

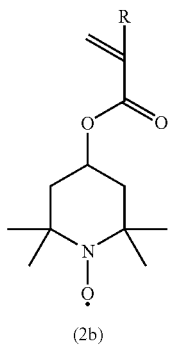

(2b)

(in the formula, R represents a hydrogen atom or a methyl group) is polymerized in the presence of a crosslinking agent to produce a crosslinked poly(meth)acrylic acid nitroxide compound resulting from crosslinking of a poly(meth)acrylic acid nitroxide compound represented by the general formula (1b):

[Chem. 8]

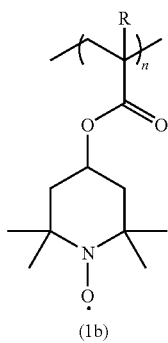

(1b)

(in the formula, R represents the same group as R in the general formula (2b) and n represents an integer of 5 to 1000000).

In the present description, the (meth)acrylic acid nitroxide compound is represented by the general formula (2b) for convenience sake, however, the compound is a product after a nitroxidation step, and therefore, some molecules thereof may contain the residual hydrogen atom as a result of incomplete nitroxidation, as mentioned hereinabove.

The (meth)acrylic acid nitroxide compound is not particularly restricted but preferably is the product of nitroxidation of a (meth)acrylic acid imino compound represented by the general formula (2a):

[Chem. 9]

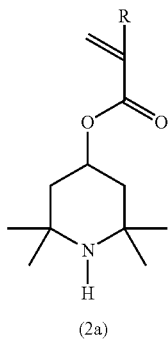

(2a)

(in the formula, R represents the same group as R in the above general formula (2b)).

The symbol R in the general formula (2b) represents the same group as R in the general formula (2a). Specifically, the (meth)acrylic acid nitroxide compound represented by the general formula (2b) is 2,2,6,6-tetramethyl-4-piperidinyloxy (meth)acrylate.

As for the method of nitroxidation of the (meth)acrylic acid imino compound, for example, the same method as the method of producing a crosslinked poly(meth)acrylic acid nitroxide compound by nitroxidation of a crosslinked poly (meth)acrylic acid imino compound in the first mode of embodiment of the invention can be used.

Thus, the (meth)acrylic acid imino compound is mixed with an inert solvent such as a halogenated hydrocarbon and, after addition of a catalyst such as a tungsten compound or a molybdenum compound, if necessary, the reaction is allowed to proceed with stirring while adding an oxidizing agent such as a peroxide, whereby a (meth)acrylic acid nitroxide compound can be obtained.

In the practice of the invention, the method of subjecting the (meth)acrylic acid nitroxide compound represented by the general formula (2b) to polymerization reaction in the presence of a crosslinking agent is not particularly restricted but, for example, the same method as the above-mentioned solution polymerization method for producing a crosslinked poly (meth)acrylic acid imino compound from a (meth)acrylic acid imino compound in the first mode of embodiment of the invention can be used.

Thus, the method comprising mixing up the (meth)acrylic acid nitroxide compound, one of or a mixture of such crosslinking agents as ethylene glycol dimethacrylate, 1,3-butanediol dimethacrylate and 1,4-butanediol dimethacrylate, and an inert solvent, for example an aromatic hydrocarbon solvent such as benzene, toluene or xylene, an acyclic saturated hydrocarbon solvent such as n-hexane, n-heptane or ligroin, a cyclic saturated hydrocarbon solvent such as cyclopentane, methylcyclopentane, cyclohexane or methylcyclohexane or an ether solvent such as diethyl ether or tetrahydrofuran and, after deoxygenation with nitrogen gas, adding, with stirring, a polymerization initiator, for example an anionic polymerization initiator such as an alkyllithium (e.g. n-butyllithium, tert-butyllithium, 1,1-diphenylhexyllithium) makes it possible to obtain the crosslinked poly(meth)acrylic acid nitroxide compound.

As for the amount of the crosslinking agent to be used in the above reaction, from the viewpoint that the crosslinked poly (meth)acrylic acid nitroxide compound obtained shows sufficient solvent stability as a result of an appropriate degree of crosslinking and from the viewpoint of obtaining an effect proportional to the amount used, the crosslinking agent is preferably used in a proportion of 0.00001 to 0.25 mole per mole of the (meth)acrylic acid nitroxide compound, and it is desirable that the proportion be more preferably 0.00005 to 0.1 mole, still more preferably 0.0001 to 0.05 mole.

The thus-produced crosslinked poly(meth)acrylic acid nitroxide compound can be isolated from the reaction mixture by the combined use of such unit operations as filtration and drying.

By binding or firmly attaching the crosslinked poly(meth) acrylic acid nitroxide compound obtained in accordance with the invention to current collectors, it is possible to manufacture electrodes for secondary batteries.

The current collector is an electrode constituent capable of collecting electric charges generated from an electrode of a secondary battery and is made of a conductor. Generally used as the material of collectors are foils, sheets and meshes of such a metal as nickel, aluminum, copper, gold, silver, aluminum alloy or stainless steel, and carbon rods, among others.

The method of producing a secondary battery electrode according to the invention comprises a coating composition preparation step of preparing a coating composition using the crosslinked poly(meth)acrylic acid nitroxide compound and a coating step of applying the coating composition to current collectors.

The method of coating composition preparation and the method of application are not particularly restricted but can be carried out using those methods and apparatus known in the art.

As the method of coating composition preparation, there may be mentioned, for example, the method comprising admixing a binder with the crosslinked poly(meth)acrylic acid nitroxide compound and then adding a solvent to render the mixture slurry-like. As specific examples of the binder, there may be mentioned, for example, resin binders such as polyvinylidene fluoride, vinylidene fluoride-hexafluoropropylene copolymers, vinylidene fluoride-tetrafluoroethylene copolymers, styrene-butadiene copolymer rubbers, polypropylene, polyethylene, polyimides and various polyurethanes. As specific examples of the solvent, there may be mentioned, for example, dimethylformamide and N-methylpyrrolidone.

As for the method of application, there may be mentioned, for example, the method causing the slurry prepared by the above-mentioned coating composition preparation to fall dropwise onto the current collector surface, developing or spreading the drops with a wire bar to render the whole layer uniform in thickness and then removing the solvent by drying.

In preparing the coating composition, an auxiliary conductive material and/or an ionic conduction auxiliary may be added, each in an appropriate amount, to the crosslinked poly(meth)acrylic acid nitroxide compound for the purpose of decreasing the impedance. As specific examples of the auxiliary conductive material, there may be mentioned carbonaceous minute particles such as graphite, carbon black and acetylene black, and conductive macromolecules such as polyaniline, polypyrrole, polythiophene, polyacetylene and polyacene. As specific examples of the ionic conduction auxiliary, there may be mentioned polymer gel electrolytes and polymer solid electrolytes, among others.

It is desirable that the coat layer obtained by applying the crosslinked poly(meth)acrylic acid nitroxide compound-containing coating composition preferably have a thickness of 10 to 1000 μm, more preferably 50 to 300 μm.

The electrodes obtained by the production method of the invention can suitably be used as materials for secondary batteries high in capacity and in energy density, for example lithium ion secondary batteries and so forth.

Effect of the Invention

The invention provides a method of producing a crosslinked poly(meth)acrylic acid compound, in particular a crosslinked poly(meth)acrylic acid nitroxide compound excellent in stability against solvents and useful as electrode active materials for secondary batteries, as well as a method of producing a secondary battery electrode using such a compound.

BEST MODES FOR CARRYING OUT THE INVENTION

The following examples and comparative examples illustrate the invention more specifically, however, these examples are by no means limitative of the scope of the invention.

EXAMPLE 1

A 500-ml four-necked flask equipped with a stirrer, nitrogen gas inlet tube, thermometer and reflux condenser was charged with 70.0 g (311 millimoles) of 2,2,6,6-tetramethyl-4-piperidinyl methacrylate, 1.23 g (6.2 millimoles) of ethylene glycol dimethacrylate and 150 ml of tetrahydrofuran, and a homogeneous solution was obtained. While this solution was maintained at 25° C., the oxygen in the reaction system was purged by passing nitrogen gas and, then, 0.358 g (2.2 millimoles) of α,α'-azobisisobutyronitrile was added as a polymerization initiator and the reaction was allowed to proceed with stirring at 50° C. for 6 hours. After completion of the reaction, the reaction mixture was cooled to room temperature and poured into 2000 ml of hexane and, then, a crosslinked polymethacrylic acid imino compound was recovered by filtration. The thus-obtained crosslinked polymethacrylic acid imino compound was washed with 500 ml of hexane and then dried under reduced pressure to give 69.5 g of the crosslinked polymethacrylic acid imino compound as a white powder (yield 97.6%).

Then, a 500-ml four-necked flask equipped with a stirrer, nitrogen gas inlet tube, thermometer, reflux condenser and dropping funnel was charged with 18 g of the crosslinked polymethacrylic acid imino compound obtained in the above manner and 150 ml of dichloromethane, and the oxygen in the reaction system was purged by passing nitrogen gas while maintaining the system at 25° C. and, then, a solution of 34.0 g of m-chloroperbenzoic acid (purity 65% by weight, 128.0 millimoles) in 200 ml of dichloromethane was added dropwise over 5 hours. Thereafter, the system was maintained at 25° C. for 6 hours and, then, the white precipitate was separated and removed from the reaction mixture by centrifugation, the remaining upper layer was washed with 150 ml of a 10% (by weight) aqueous solution of potassium carbonate and with 150 ml of a saturated aqueous solution of sodium chloride, and the organic layer was dehydrated with an appropriate amount of magnesium sulfate, and after removal of the magnesium sulfate, the solvent was evaporated to dryness under reduced pressure, and 17.2 g of a crosslinked polymethacrylic acid nitroxide compound was obtained as a red powder.

EXAMPLE 2

The procedure of Example 1 was followed in the same manner except that 2.50 g (12.5 millimoles) of ethylene glycol dimethacrylate was used in lieu of 1.23 g (6.2 millimoles) of ethylene glycol dimethacrylate, to give 17.2 g of a crosslinked polymethacrylic acid nitroxide compound as a red powder.

EXAMPLE 3

The procedure of Example 1 was followed in the same manner except that 1.40 g (6.2 millimoles) of 1,3-butanediol dimethacrylate was used in lieu of 1.23 g (6.2 millimoles) of ethylene glycol dimethacrylate, to give 17.2 g of a crosslinked polymethacrylic acid nitroxide compound as a red powder.

EXAMPLE 4

A one-liter four-necked flask equipped with a stirrer, nitrogen gas inlet tube, thermometer, reflux condenser and dropping funnel was charged with 70.0 g (311 millimoles) of 2,2,6,6-tetramethyl-4-piperidinyl methacrylate and 600 ml of dichloromethane, the oxygen in the reaction system was purged by passing nitrogen gas while maintaining the system at 25° C. and, then, a solution of 132.3 g of m-chloroperbenzoic acid (purity 65% by weight, 498.0 millimoles) in 200 ml of dichloromethane was added dropwise over 5 hours. The resultant mixture was then maintained at 25° C. for 6 hours and, then, the reaction mixture was filtered to separate a white precipitate, the filtrate was washed with 600 ml of a 10% (by weight) aqueous solution of potassium carbonate and with 600 ml of a saturated aqueous solution of sodium chloride, and the organic layer was dehydrated with an appropriate amount of magnesium sulfate, and after removal of the magnesium sulfate, the solvent was evaporated to dryness under reduced pressure to give 70.2 g of a methacrylic acid nitroxide compound as a red powder.

Then, a 500-ml four-necked flask equipped with a stirrer, nitrogen gas inlet tube, thermometer and reflux condenser was charged with 70.0 g (292 millimoles) of the methacrylic acid nitroxide compound obtained in the above manner, together with 1.23 g (6.2 millimoles) of ethylene glycol dimethacrylate and 150 ml of dehydrated toluene, and a homogeneous solution was obtained. The oxygen gas in the reaction system was purged by passing nitrogen gas while maintaining the solution at 0° C. and, then, 1.4 ml (2.2 millimoles or 0.14 g as n-butyllithium) of a commercial hexane solution of n-butyllithium (1.5 mol/l) was added as a polymerization initiator, and the reaction was allowed to proceed at 0° C. under stirring for 6 hours, followed by addition of methanol to terminate the reaction. After completion of the reaction, the reaction mixture was returned to room temperature and poured into 2000 ml of hexane, and a crosslinked polymethacrylic acid nitroxide compound was recovered by filtration. The crosslinked polymethacrylic acid nitroxide compound obtained was washed with 500 ml of hexane and then washed with 500 ml of a 10% (by weight) aqueous solution of potassium carbonate and with 500 ml of a saturated aqueous solution of sodium chloride, the organic layer was dehydrated with an appropriate amount of magnesium sulfate and, after removal of the magnesium sulfate, the solvent was evaporated to dryness under reduced pressure to give 67.0 g of the crosslinked polymethacrylic acid nitroxide compound as a red powder (yield in the polymerization step 94.1%).

EXAMPLE 5

A 200-ml Erlenmeyer flask was charged with 22.5 g (100 millimoles) of 2,2,6,6-tetramethyl-4-piperidinyl methacrylate, 0.40 g (2.0 millimoles) of ethylene glycol dimethacrylate, 0.115 g (0.7 millimole) of α,α'-azobisisobutyronitrile as a polymerization initiator and 35 ml of toluene, and the mixture was stirred to give a homogeneous solution. Separately, a 500-ml four-necked flask equipped with a stirrer, nitrogen gas inlet tube, thermometer and reflux condenser was charged with 200 ml of water and 0.30 g of sodium dodecylbenzenesulfonate as a surfactant, which were mixed up, and while maintaining the resulting solution at 25° C., the above-mentioned homogeneous solution was added thereto with stirring and dispersed therein. Then, the oxygen in the reaction system was purged by passing nitrogen gas and, thereafter, the reaction was allowed to proceed at 60° C. for 6 hours. After completion of the reaction, the reaction mixture was cooled to room temperature and filtered, whereby a crosslinked polymethacrylic acid imino compound was obtained. The crosslinked polymethacrylic acid imino compound obtained was washed with 500 ml of water and then with 500 ml of hexane and, thereafter, dried under reduced pressure to give 22.8 g of the crosslinked polymethacrylic acid imino compound as a white powder (yield 99.5%).

Then, a 500-ml four-necked flask equipped with a stirrer, nitrogen gas inlet tube, thermometer, reflux condenser and dropping funnel was charged with 10 g of the crosslinked polymethacrylic acid imino compound obtained in the above manner and 300 ml of methanol, and the oxygen in the reaction system was purged by passing nitrogen gas while maintaining the system at 25° C., and thereafter, 50.4 g (445 millimoles) of a 30% aqueous solution of hydrogen peroxide was added dropwise over 3 hours. The resulting mixture was then maintained at 25° C. for 8 hours and, thereafter, the reaction mixture was filtered, whereupon a crosslinked polymethacrylic acid nitroxide compound was obtained. The crosslinked polymethacrylic acid nitroxide compound obtained was washed with 500 ml of methanol and then with 500 ml of water, and the subsequent drying under reduced pressure gave 10.0 g of the crosslinked polymethacrylic acid nitroxide compound as a red powder.

EXAMPLE 6

22.6 g of a crosslinked polymethacrylic acid imino compound was obtained as a white powder in the same manner as in Example 5 except that 0.60 g of sodium dodecylbenzenesulfonate was used in lieu of 0.30 g of sodium dodecylbenzenesulfonate (yield 98.7%).

Then, a 500-ml four-necked flask equipped with a stirrer, nitrogen gas inlet tube, thermometer, reflux condenser and dropping funnel was charged with 10 g of the crosslinked polymethacrylic acid imino compound obtained, 0.73 g (2.2 millimoles) of sodium tungstate dihydrate as a catalyst and 300 ml of methanol, the oxygen in the reaction system was purged by passing nitrogen gas while maintaining the system at 25° C. and, thereafter, 50.4 g (445 millimoles) of a 30% aqueous solution of hydrogen peroxide was added dropwise over 3 hours. Thereafter, the system was maintained at 25° C. for 2 hours, and the reaction mixture was then filtered to give a crosslinked polymethacrylic acid nitroxide compound. The crosslinked polymethacrylic acid nitroxide compound obtained was washed with 500 ml of methanol and then with 500 ml of water and thereafter dried under reduced pressure to give 10.1 g of the crosslinked polymethacrylic acid nitroxide compound as a red powder.

EXAMPLE 7

22.8 g of a crosslinked polymethacrylic acid imino compound was obtained as a white powder in the same manner as in Example 5 except that 0.91 g (4.0 millimoles) of 1,4-butanediol dimethacrylate was used in lieu of 0.40 g (2.0 millimoles) of ethylene glycol dimethacrylate (yield 97.4%).

Then, a 500-ml four-necked flask equipped with a stirrer, nitrogen gas inlet tube, thermometer, reflux condenser and dropping funnel was charged with 10 g of the crosslinked polymethacrylic acid imino compound obtained, 0.65 g (2.0 millimoles) of sodium tungstate dihydrate as a catalyst and 300 ml of methanol, the oxygen in the reaction system was purged by passing nitrogen gas while maintaining the system at 25° C. and, thereafter, 50.4 g (445 millimoles) of a 30% aqueous solution of hydrogen peroxide was added dropwise over 3 hours. Thereafter, the system was maintained at 25° C. for 2 hours, and the reaction mixture was then filtered to give a crosslinked polymethacrylic acid nitroxide compound. The crosslinked polymethacrylic acid nitroxide compound obtained was washed with 500 ml of methanol and then with 500 ml of water and thereafter dried under reduced pressure to give 10.2 g of the crosslinked polymethacrylic acid nitroxide compound as a red powder.

EXAMPLE 8

A 500-ml four-necked flask equipped with a stirrer, nitrogen gas inlet tube, thermometer and reflux condenser was charged with 45.0 g (200 millimoles) of 2,2,6,6-tetramethyl-4-piperidinyl methacrylate, 0.80 g (4.0 millimoles) of ethylene glycol dimethacrylate, 0.30 g of polyoxyethylene nonylphenyl ether dodecylbenzenesulfonic acid sodium salt as a surfactant, and 140 ml of water, and the whole charge was stirring at 65° C., a temperature higher than the melting point (60° C.) of 2,2,6,6-tetramethyl-4-piperidinyl methacrylate, for 1 hour, whereby a homogeneous solution was obtained. Then, the oxygen in the reaction system was purged by passing nitrogen gas and, thereafter, 0.379 g (1.4 millimoles) of potassium persulfate was added as a polymerization initiator and the reaction was allowed to proceed with stirring at 70° C. for 6 hours. After completion of the reaction, the reaction mixture was cooled to room temperature and poured into cold water (2000 ml) at 5° C. and, then, a crosslinked polymethacrylic acid imino compound was recovered by filtration. The thus-obtained crosslinked polymethacrylic acid imino compound was washed with 500 ml of water and then dried under reduced pressure to give 43.5 g of the crosslinked polymethacrylic acid imino compound as a white powder (yield 95.0%).

Then, a 500-ml four-necked flask equipped with a stirrer, nitrogen gas inlet tube, thermometer, reflux condenser and dropping funnel was charged with 10 g of the crosslinked polymethacrylic acid imino compound obtained in the above manner and 300 ml of methanol, and the oxygen in the reaction system was purged by passing nitrogen gas while maintaining the system at 25° C. and, then, 50.4 g (445 millimoles) of a 30% aqueous solution of hydrogen peroxide was added dropwise over 3 hours. Thereafter, the system was maintained at 25° C. for 8 hours and, then, the reaction mixture was filtered to give a crosslinked polymethacrylic acid nitroxide compound. The crosslinked polymethacrylic acid nitroxide compound obtained was washed with 500 ml of methanol and then with 500 ml of water and then dried under reduced pressure to give 10.0 g of the crosslinked polymethacrylic acid nitroxide compound as a red powder.

COMPARATIVE EXAMPLE 1

The procedure of Example 1 was followed in the same manner except that the use of 1.23 g (6.2 millimoles) of ethylene glycol dimethacrylate was omitted, and a red powder (16.9 g) was obtained.

COMPARATIVE EXAMPLE 2

The procedure of Example 4 was followed in the same manner except that the use of 1.23 g (6.2 millimoles) of ethylene glycol dimethacrylate was omitted, and a red powder (65.8 g) was obtained.

COMPARATIVE EXAMPLE 3

The procedure of Example 6 was followed in the same manner except that the use of 0.40 g (2.0 millimoles) of ethylene glycol dimethacrylate was omitted, and a red powder (10.3 g) was obtained.

COMPARATIVE EXAMPLE 4

The procedure of Example 8 was followed in the same manner except that the use of 0.80 g (4.0 millimoles) of ethylene glycol dimethacrylate was omitted, and a red powder (10.3 g) was obtained.

Evaluation of Crosslinked Polymethacrylic Acid Nitroxide Compounds or Red Powders Each of the red powders obtained in the examples and comparative examples was evaluated for the solubility in the solvent, namely propylene carbonate, diethyl carbonate or a ethylene carbonate/diethyl carbonate mixed solvent (weight ratio: 3/7). Each powder was admixed with each solvent to a powder concentration of 10% by weight, the mixture was stirred at room temperature for 24 hours and then filtered, and the filtrate obtained was subjected to 15 hours of vacuum drying at 150° C. and 10 mm Hg, to give a crude soluble fraction. This crude soluble fraction was washed with pure water and dried under reduced pressure at 150° C. and 10 mmHg for 3 hours, and the solubility was calculated based on the weight of the soluble fraction obtained. The results thus obtained are shown in Table 1.

TABLE 1

| | Solubility (%) | | |
|---|---|---|---|
| | propylene carbonate | diethyl carbonate | ethylene carbonate/diethyl carbonate mixed solvent |
| Example 1 | <1 | <1 | <1 |
| Example 2 | <1 | <1 | <1 |
| Example 3 | <1 | <1 | <1 |
| Example 4 | <1 | <1 | <1 |
| Example 5 | <1 | <1 | <1 |
| Example 6 | <1 | <1 | <1 |
| Example 7 | <1 | <1 | <1 |
| Example 8 | <1 | <1 | <1 |
| Comparative Example 1 | 96 | 96 | 96 |
| Comparative Example 2 | 99 | 99 | 99 |
| Comparative Example 3 | 96 | 96 | 96 |
| Comparative Example 4 | 96 | 96 | 96 |

The results shown in Table 1 indicate that the red powders obtained in Examples 1 to 8 showed a solubility lower than 1% in any of the solvents used for evaluation and, therefore, they are excellent in stability against solvents.

The red powder obtained in Example 2 was admixed with each of the solvents used in a proportion of the powder of 10% by weight, and each mixture was stored at 40° C. with stirring. After the lapse of each specified period of time, the mixture was filtered, and the filtrate was subjected to 15 hours of vacuum drying at 150° C. and 10 mmHg to give a crude soluble fraction. This crude soluble fraction was washed with pure water and dried under reduced pressure at 150° C. and 10 mmHg for 3 hours, and the solubility was calculated based on the weight of the soluble fraction obtained. The results thus obtained are shown in Table 2.

TABLE 2

| | Solubility (%) | | |
|---|---|---|---|
| | after 10 days of strage | after 20 days of strage | after 50 days of strage |
| Propylene carbonate | <1 | <1 | <1 |
| Diethyl carbonate | <1 | <1 | <1 |
| Ethylene carbonate/ diethyl carbonate mixed solvent | <1 | <1 | <1 |

The results shown in Table 2 indicate that the red powder obtained in Examples 2 showed a solubility lower than 1% in any of the solvents used for evaluation over the storage period of 50 days and, therefore, it is excellent in long-term stability against solvents.

EXAMPLE 9

Construction of an Electrode for Lithium Ion Secondary Battery and of a Lithium Ion Secondary Battery)

(1) Lithium Ion Secondary Battery Electrode Preparation

The red powder of the crosslinked polymethacrylic acid nitroxide compound as obtained in Example 1 was ground in an agate mortar to a particle diameter of not greater than 100 μm, and a 1-g portion of the powder was mixed with 50 g of N-methylpyrrolidone as a solvent, 10 mg of polyvinylidene fluoride as a binder and 0.9 of a graphite powder as an auxiliary conductive material, followed by stirring to give a black slurry. A 2-g portion of this slurry was dropped onto the surface of an aluminum foil (area: 1.5 cm×1.5 cm, thickness: 100 μm) fitted with a lead wire, and the drops were spread by means of a wire bar to render the whole uniform in thickness and then dried under reduced pressure at 120° C. for 6 hours, and therefore an electrode comprising the red powder obtained in Example 1 as bound to the current collector was thus constructed. The thickness of the red powder-based coat layer was measured using a film thickness measuring apparatus (product of Moritex Corp., model MHF-D100LR) and found to be 150 μm.

(2) Construction of a Lithium Ion Secondary Battery

An electrolyte solution was prepared by adding vinylidene fluoride-hexafluoropropylene copolymer (600 mg) and 11.3 g of tetrahydrofuran to 1400 mg of an ethylene carbonate/ diethyl carbonate mixed solution (weight ratio: 3/7) containing 1 mol/l of $LiPF_6$ as an electrolyte salt, followed by stirring at room temperature. This electrolyte solution was applied to a glass plate having a difference in level and then allowed to stand at room temperature overnight for air drying to give an electrolyte film with a thickness of 1 mm. A section (2.0 cm×2.0 cm) was cut out of this electrolyte film and laminated onto the electrode, which was preliminarily constructed, comprising the red powder obtained in Example 1 as bound to the current collector and, further, a lithium-cladded copper foil (lithium layer thickness 30 μm, copper foil thickness 20 μm) fitted with a lead wire was laid thereon. Then, using a 5-mm-thick polytetrafluoroethylene sheet, the whole was rolled up to contact pressing the layers with one another, and a lithium ion secondary battery using the electrode comprising the red powder obtained in Example 1 as bound to the current collector was thus constructed.

COMPARATIVE EXAMPLE 5

An electrode and a lithium ion second battery using this electrode were constructed in the same manner as in Example 9 except that the red powder obtained in Comparative Example 1 was used in lieu of the red powder of the crosslinked polymethacrylic acid nitroxide compound as obtained in Example 1. The thickness of the red powder-based coat layer was measured in the same manner as in Example 9 and found to be 150 μm.

Lithium Ion Secondary Battery Evaluation

The lithium ion secondary battery obtained in Example 9 and the lithium ion secondary battery constructed by using an electrode comprising the red powder bound to the current collector as obtained in Comparative Example 5 were each connected to a charge/discharge tester (product of Kabushiki Kaisha Nagano, BTS2004W) and evaluated for charge/discharge characteristics at a constant current density (42 $\mu A/cm^2$, 20° C.).

The lithium ion secondary battery obtained in Example 9 showed a voltage plateau at about 3.5 to 3.6 V and, upon repeated charging and discharging, it could stand at least 100 cycles of charging and discharging. On the contrary, the lithium ion secondary battery obtained in Comparative Example 5 initially showed a similar voltage plateau but, upon repeated charging and discharging, it could stand only several cycles of charging and discharging.

INDUSTRIAL APPLICABILITY OF THE INVENTION

In accordance with the invention, an electrode material useful in producing high-energy-density, high-capacity secondary batteries, and a method of producing an electrode, can be provided.

The invention claimed is:

1. A method of producing a crosslinked poly(meth)acrylic acid nitroxide compound resulting from crosslinking of a poly(meth)acrylic acid nitroxide compound, wherein the crosslinked poly(meth)acrylate nitroxide compound is used in a secondary battery electrode and being represented by the general formula (1):

[Chem. 1]

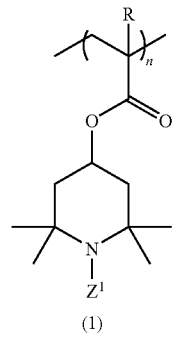

(1)

wherein n $Z^1$s each are an oxygen atom having one unpaired electron or comprise hydrogen atoms and oxygen atoms having one unpaired electron, R represents a hydrogen atom or a methyl group and n represents an integer of 5 to 1000000, which method is characterized by comprising a polymerization step of polymerizing a (meth)acrylic acid imino compound represented by the general formula (2):

[Chem. 2]

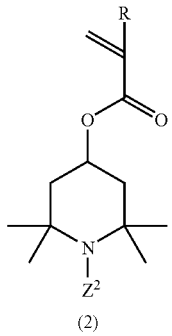

(2)

wherein $Z^2$ represents a hydrogen atom; and R represents the same group as R in the above general formula (1) in the presence of a crosslinking agent, the crosslinking agent being used in an amount of 0.00001 to 0.25 mole per mole of the (meth)acrylic acid imino compound, the polymerization step of producing a crosslinked poly (meth)acrylic acid imino compound resulting from crosslinking of a poly(meth)acrylic acid imino compound represented by the general formula (1a):

[Chem. 3]

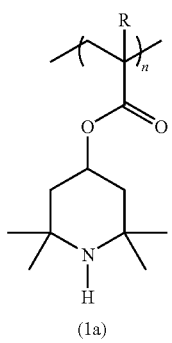

(1a)

same group as R in the above general formula (1) and n represents the same integer as n in the general formula (1), and further comprising a nitroxidation step for the nitroxidation of the above crosslinked poly(meth)acrylic acid imino compound.

2. A method of producing a crosslinked poly(meth)acrylic acid nitroxide compound, wherein the crosslinked poly (meth)acrylate nitroxide compound is used in a secondary battery electrode, resulting from crosslinking of a poly(meth)acrylic acid nitroxide compound represented by the general formula (1):

[Chem. 4]

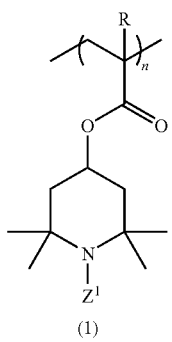

(1)

wherein n $Z^1$s each are an oxygen atom having one unpaired electron or comprise hydrogen atoms and oxygen atoms having one unpaired electron, R represents a hydrogen atom or a methyl group and n represents an integer of 5 to 1000000, which method is characterized by comprising a polymerization step of polymerizing a (meth)acrylic acid nitroxide compound represented by the general formula (2):

(2)

[Chem. 5]

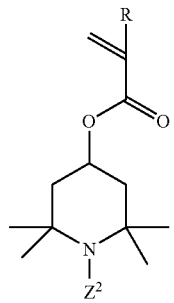

wherein $Z^2$ is an oxygen atom having one unpaired electron, the compound being allowed to contain a (meth)acrylic acid imino compound of the general formula (2), $Z^2$ being a hydrogen atom; and R represents the same group as R in the above general formula (1) in the presence of a crosslinking agent, the crosslinking agent being used in an amount of 0.00001 to 0.25 mole per mole of the (meth)acrylic acid compound.

3. A method of producing a crosslinked poly(meth)acrylic acid nitroxide compound, wherein the crosslinked poly (meth)acrylate nitroxide compound is used in a secondary battery electrode, according to claim 2, wherein the (meth)acrylic acid nitroxide compound is obtained by nitroxidation of a (meth)acrylic acid imino compound represented by the general formula (2a):

[Chem. 6]

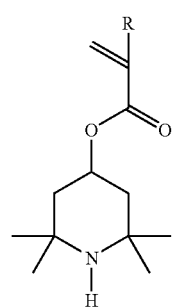

(2a)

wherein R represents the same group as R in the above general formula (1).

4. A method of producing a crosslinked poly(meth)acrylic acid nitroxide compound, wherein the crosslinked poly (meth)acrylate nitroxide compound is used in a secondary battery electrode, according to claim 1, wherein the method of polymerization in the polymerization step is the suspension polymerization method.

5. A method of producing a crosslinked poly(meth)acrylic acid nitroxide compound, wherein the crosslinked poly (meth)acrylate nitroxide compound is used in a secondary battery electrode, according to claim 1, wherein the method of polymerization in the polymerization step is the emulsion polymerization method.

6. A method of producing a crosslinked poly(meth)acrylic acid nitroxide compound, wherein the crosslinked poly(meth)acrylate nitroxide compound is used in a secondary battery electrode, according to claim 1,
wherein the crosslinking agent comprises at least one species selected from the group consisting of ethylene glycol di(meth)acrylate, 1,3-butanediol di(meth)acrylate and 1,4-butanediol di(meth)acrylate.

7. A method of producing a secondary battery electrode, which comprises a coating composition preparation step of preparing a coating composition using a crosslinked poly(meth)acrylic acid nitroxide compound and a coating step of applying said coating composition to a current collector,
said crosslinked poly(meth)acrylic acid nitroxide compound being a crosslinked poly(meth)acrylic acid nitroxide compound produced by the method of producing a crosslinked poly(meth)acrylic acid nitroxide compound according to claim 1.

8. A method of producing a crosslinked poly(meth)acrylic acid nitroxide compound, wherein the crosslinked poly(meth)acrylate nitroxide compound is used in a secondary battery electrode, according to claim 2,
wherein the crosslinking agent comprises at least one species selected from the group consisting of ethylene glycol di(meth)acrylate, 1,3-butanediol di(meth)acrylate and 1,4-butanediol di(meth)acrylate.

9. A method of producing a crosslinked poly(meth)acrylic acid nitroxide, wherein the crosslinked poly(meth)acrylate nitroxide compound is used in a secondary battery electrode, compound according to claim 3,
wherein the crosslinking agent comprises at least one species selected from the group consisting of ethylene glycol di(meth)acrylate, 1,3-butanediol di(meth)acrylate and 1,4-butanediol di(meth)acrylate.

10. A method of producing a crosslinked poly(meth)acrylic acid nitroxide compound, wherein the crosslinked poly(meth)acrylate nitroxide compound is used in a secondary battery electrode, according to claim 4,
wherein the crosslinking agent comprises at least one species selected from the group consisting of ethylene glycol di(meth)acrylate, 1,3-butanediol di(meth)acrylate and 1,4-butanediol di(meth)acrylate.

11. A method of producing a crosslinked poly(meth)acrylic acid nitroxide compound, wherein the crosslinked poly(meth)acrylate nitroxide compound is used in a secondary battery electrode, according to claim 5,
wherein the crosslinking agent comprises at least one species selected from the group consisting of ethylene glycol di(meth)acrylate, 1,3-butanediol di(meth)acrylate and 1,4-butanediol di(meth)acrylate.

12. A method of producing a crosslinked poly(meth)acrylic acid nitroxide compound, wherein the crosslinked poly(meth)acrylate nitroxide compound is used in a secondary battery electrode, according to claim 3,
wherein the crosslinking agent is used in an amount of 0.00001 to 0.25 mole per mole of the (meth)acrylic acid compound.

* * * * *